(12) United States Patent
Boutami et al.

(10) Patent No.: US 10,845,296 B2
(45) Date of Patent: Nov. 24, 2020

(54) OPTICAL PARTICLE DETECTOR

(71) Applicant: COMMISSARIAT A L'ENERGIE ATOMIQUE ET AUX ENERGIES ALTERNATIVES, Paris (FR)

(72) Inventors: Salim Boutami, Grenoble (FR); Mathieu Dupoy, Coublevie (FR); Jean-Marc Fedeli, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/486,732

(22) PCT Filed: Feb. 20, 2018

(86) PCT No.: PCT/EP2018/054112
§ 371 (c)(1),
(2) Date: Oct. 21, 2019

(87) PCT Pub. No.: WO2018/150044
PCT Pub. Date: Aug. 23, 2018

(65) Prior Publication Data
US 2020/0049617 A1 Feb. 13, 2020

(30) Foreign Application Priority Data
Feb. 20, 2017 (FR) ...................... 17 51343

(51) Int. Cl.
*G01N 15/14* (2006.01)
*G01N 15/02* (2006.01)
*G01N 15/00* (2006.01)

(52) U.S. Cl.
CPC ..... *G01N 15/1436* (2013.01); *G01N 15/0205* (2013.01); *G01N 15/1459* (2013.01); *G01N 2015/0046* (2013.01)

(58) Field of Classification Search
CPC .......... G01N 15/1436; G01N 15/0205; G01N 15/1459; G01N 2015/0046
(Continued)

(56) References Cited

U.S. PATENT DOCUMENTS 4,739,177 A   4/1988   Borden
5,222,389 A *  6/1993   Wong ................... G01N 1/2258
                                              250/338.5

(Continued)

FOREIGN PATENT DOCUMENTS

CN    104280321 A    1/2015
FR    2 963 101 A1   1/2012

OTHER PUBLICATIONS

International Search Report dated May 18, 2018 in PCT/EP2018/054112 filed Feb. 20, 2018.

*Primary Examiner* — Roy M Punnoose
(74) *Attorney, Agent, or Firm* — Oblon, McClelland, Maier & Neustadt, L.L.P.

(57) ABSTRACT

A particle detector is provided, including at least one channel configured to receive at least one fluid including particles; one optical inlet configured to receive at least one incident luminous radiation; one first plurality of reflecting surfaces arranged between the optical inlet and the channel; one matrix of photo detectors arranged facing the channel; and one second plurality of reflecting surfaces arranged between the channel and the matrix of photo detectors such that the channel is disposed between the first and the second pluralities of reflecting surfaces.

18 Claims, 8 Drawing Sheets

(58) Field of Classification Search
USPC .......................................................... 356/343
See application file for complete search history.

(56) References Cited

U.S. PATENT DOCUMENTS

| | | | | |
|---|---|---|---|---|
| 5,273,633 | A | | 12/1993 | Wang |
| 5,515,859 | A | * | 5/1996 | Paz .................... A61B 5/083 250/339.1 |
| 5,625,189 | A | * | 4/1997 | McCaul ............... G01N 21/274 250/341.1 |
| 5,793,485 | A | | 8/1998 | Gourley |
| 5,854,685 | A | * | 12/1998 | Levine .................. G01J 3/1838 356/440 |
| 6,181,426 | B1 | * | 1/2001 | Bender .............. G01N 21/3504 356/432 |
| 6,580,504 | B1 | | 6/2003 | Ortyn et al. |
| 6,940,600 | B1 | * | 9/2005 | Smith .................. G01N 21/031 356/437 |
| 8,339,607 | B2 | * | 12/2012 | Levine ............... G01N 21/3151 356/432 |
| 10,247,665 | B2 | * | 4/2019 | Rissing ................ G01N 21/031 |

* cited by examiner

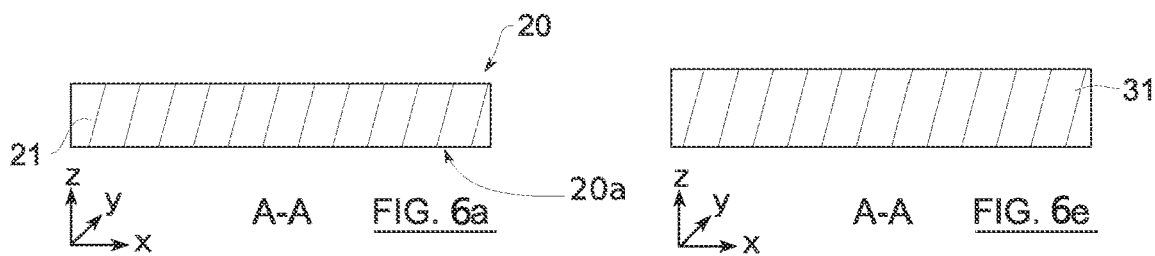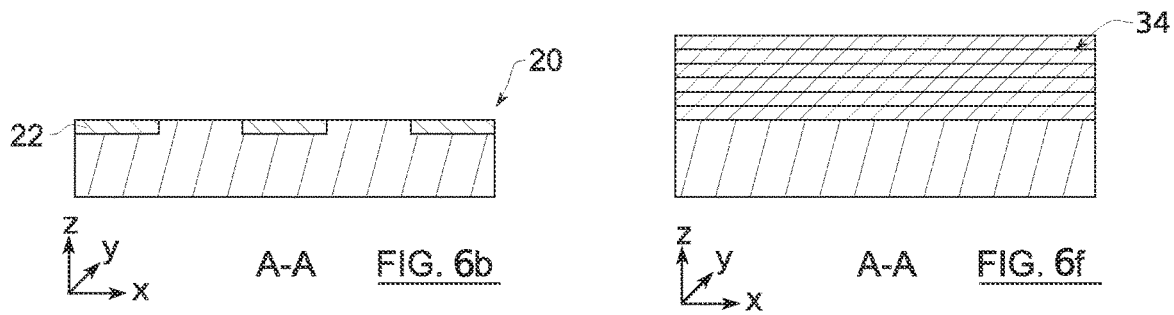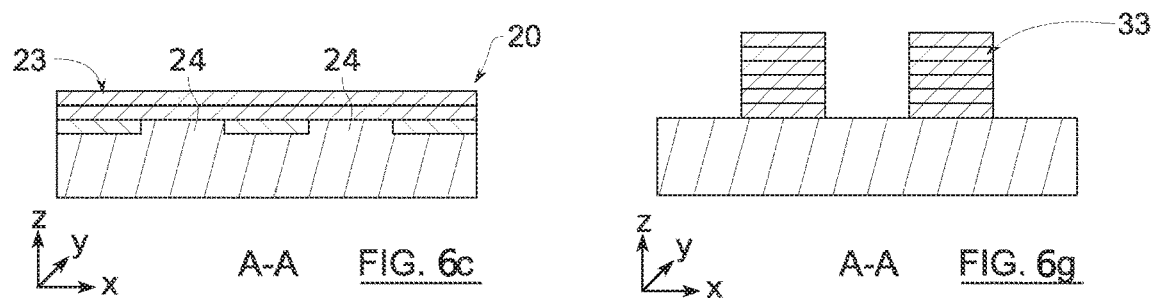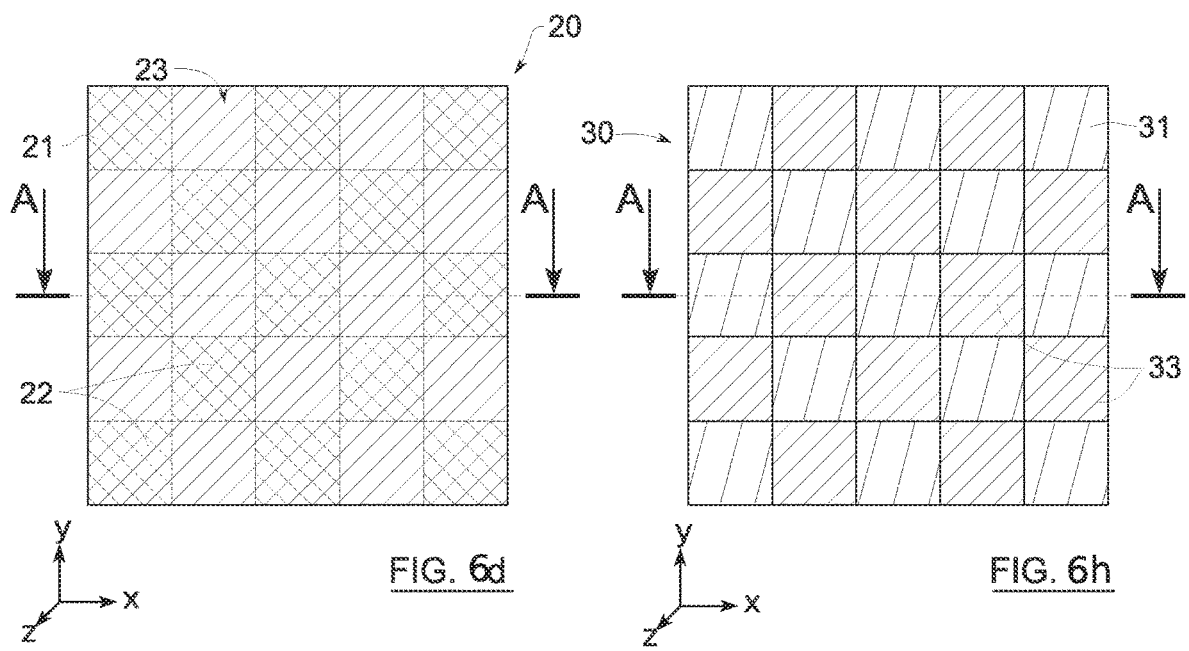

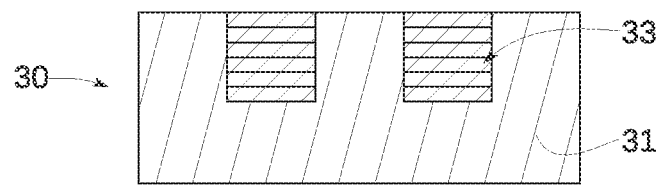
A-A FIG. 6i
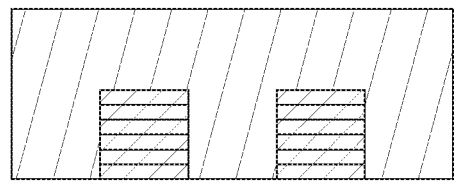
A-A FIG. 6j
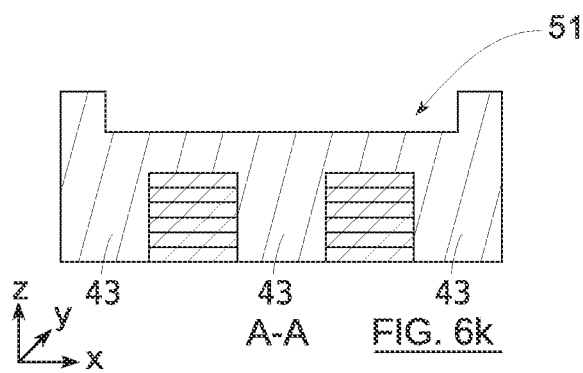
A-A FIG. 6k
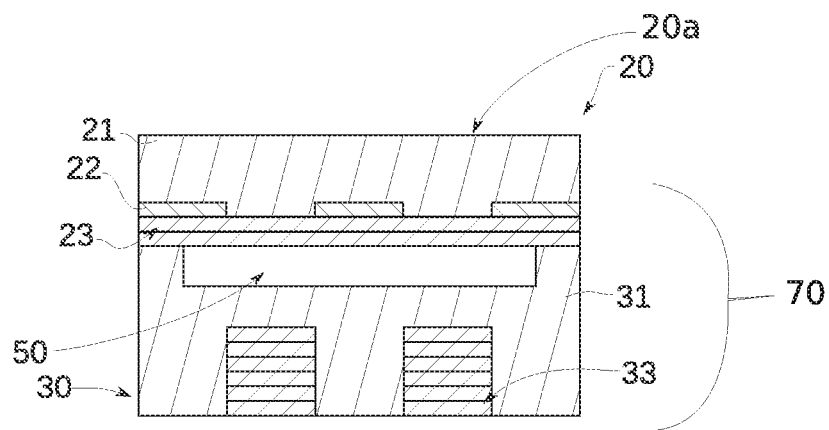
A-A FIG. 6l

OPTICAL PARTICLE DETECTOR

TECHNICAL FIELD OF THE INVENTION

The present invention relates to the field of the optical detection of particles in general and more particularly of particles of micrometric size, even nanometric size. It will have for a particularly advantageous purpose non-limiting application the detection of particles of smoke for detecting fires or the detection of polluting particles and in particular the so-called fine particles.

PRIOR ART

Particle detectors are generally based on the diffraction of visible light, or near infrared, by particles. These detectors thus generally comprise optical sensors configured to measure the diffraction of the light by the particles.

The detectors comprise a light source and a channel through which pass the particles to be detected. In the absence of particles, there is no diffraction, the optical sensors therefore do not measure light. In the presence of particles, the light is diffracted by the particles and the optical sensors detect the diffracted light in their solid angle of detection. This measurement thus makes it possible to detect one or several particles. Although the intensity of the diffracted light and its angular diagram are characteristics of the nature, form, size and concentration of the particles, the known solutions do not make it possible to measure all of these characteristics in a true manner, at a reasonable cost and by occupying a limited space.

Document FR2963101 describes an existing solution. This solution provides a source of light conveyed by a waveguide that illuminates a channel etched in a substrate of silicon and through which particles will circulate. The diffraction of the incident light by these particles is detected by two peripheral photodiodes carried out on the silicon substrate.

This solution makes it possible to reduce the space of the sensor. On the other hand, it is extremely difficult with this type of solution to obtain information that is sufficiently precise and complete on the particles.

It is in particular difficult, even impossible, to determine the nature of the particles.

There is therefore a need that consists in proposing a solution for improving the precision and the quantity of information with respect to the particles, so as for example to determine the nature thereof.

Such is the objective of the present invention.

SUMMARY OF THE INVENTION

The present invention relates to a detector of particles comprising at least:
- one channel intended to receive at least one fluid comprising particles;
- one optical inlet configured to receive at least one incident luminous radiation.

The detector further comprises:
- a first plurality of reflecting surfaces, able to reflect the incident luminous radiation, arranged between the optical inlet and the channel and configured to define openings that allow a portion at least of the incident luminous radiation coming from the optical inlet to reach the channel;
- a matrix of photo detectors arranged facing the channel.

Preferably but optionally the detector comprises a second plurality of reflecting surfaces, able to reflect the incident luminous radiation, arranged between the channel and the matrix of photo detectors and in such a way that the channel is located between the first and second pluralities of reflecting surfaces.

Advantageously and preferably, the first and the second plurality of reflecting surfaces, the matrix of photo detectors and the at least one channel are arranged in such a way that, if particles are present in the channel, a portion at least of the incident luminous radiation passing through the channel is scattered by at least one particle present in the channel thus forming scattered light rays and in such a way that a portion at least of said scattered light rays then reach the matrix of photo detectors, preferably by passing between the reflecting surfaces of the second pluralities of reflecting surfaces and optionally after having been reflected off at least one reflecting surface of the first plurality of reflecting surfaces.

According to a preferred embodiment, the reflecting surfaces of the second plurality extend principally in a plane and are spaced from one another in this plane in order to arrange between them spaces, in such a way that the scattered light rays can pass from the channel to the matrix of photo detectors by passing through said spaces. Thus, the scattered light rays can pass from the channel to the matrix of photo detectors without passing through a reflecting surface of said second plurality.

The association of the channel, of the first and second pluralities of reflecting surfaces and of the matrix of photo detectors, makes it possible to capture a larger number of light rays diffracted by the particles.

Indeed, the matrix of photo detectors can receive the light rays diffracted by the particles and which reach:
- directly on the matrix of photo detectors, i.e. without reflection off the reflecting surfaces;
- the light rays that reach the matrix of photo detectors after a first reflection by the first plurality of reflecting surfaces
- the light rays that reach the matrix of photo detectors after one or several reflections off the first and second pluralities of reflecting surfaces.

The invention thus makes it possible to increase the diffraction diagram to which there is access.

Indeed, in the framework of the development of the present invention it was noticed that in a solution of the type of that described in document FR2963101 mentioned hereinabove, the photo detectors capture the diffracted light laterally and detect a solid angle of the diffraction which is very limited. This type of solution then makes it possible only to access a limited portion of the diffraction diagram which reduces the wealth of information available and limits the knowledge that can be had of the particles, in particular the nature thereof.

With the invention, the combination of the first and second pluralities of reflecting surfaces, of the matrix of photo detectors, of the optical inlet and of the channel makes it possible to approximate to a two-dimensional measurement a three-dimensional diffraction.

The present invention thus allows for a projection on the same matrix of photodiodes of a very large number of light beams diffracted in varied directions in three-dimensions.

The geometry of the present invention allows for a projection of a vector space of three-dimensional propagation to a two-dimensional measuring space.

The invention thus makes it possible to collect information in a larger and more precise quantity concerning the particles. The detection of particles and the identification of the parameters thereof, such as the sizes thereof, the optical diffraction index thereof or the nature thereof, is therefore improved.

In addition, the present invention makes it possible to reduce or event prevent the blinding of the photo detectors of the matrix of photo detectors by the incident luminous radiation via the use of a first and of a second plurality of complementary reflecting surfaces, in such a way that only the scattered light rays reach the photo detectors of the matrix of photo detectors. This then makes it possible to increase the particle detection sensitivity of the present invention.

The present invention also relates to a method for the production of a detector of particles, comprising at least the following steps:

Supplying at least one first substrate comprising at least one first plurality of reflecting surfaces, able to reflect the incident luminous radiation and extending in a first plane parallel to a principal plane (x, y) and comprising at least one optical inlet configured to receive at least one incident luminous radiation in a direction inclined with respect, preferably perpendicular (z), to the principal plane (x, y), the first plurality of reflecting surfaces and the optical inlet being arranged on either side of the first substrate;

Supplying at least one second substrate comprising at least one second plurality of reflecting surfaces, able to reflect the incident luminous radiation, the second substrate extending in a second plane parallel to the principal plane (x, y);

Supplying at least one third substrate comprising at least one matrix of photo detectors extending in a third plan parallel to the principal plane (x, y);

Forming a stack extending in the principal plane (x, y) by assembling the first substrate, the second substrate and the third substrate in such a way that:
  the first (20) and second (30) substrates delimit, in the plane (z, x), at least in part, and more preferably entirely, a channel for the circulation of particles;
  the first (22) and second (32) pluralities of reflecting surfaces are located between the matrix of photo detectors and the optical inlet;
  the first and the second plurality of reflecting surfaces, the matrix of photo detectors and the channel being arranged in such a way that, if particles are present in the channel, a portion at least of the incident luminous radiation passing through the channel is scattered by at least one particle present in the channel thus forming scattered light rays and in such a way that a portion at least of said scattered light rays reaches the matrix of photo detectors by passing between the reflecting surfaces of the second plurality of reflecting surfaces, and optionally after having been reflected off at least one reflecting surface of the first plurality of reflecting surfaces.

Preferably, the stack is formed in such a way that the reflecting surfaces of the second plurality extend principally in a plane and are spaced from one another in this plane in order to arrange between them spaces, in such a way that the scattered light rays can pass from the channel to the matrix of photo detectors by passing between the reflecting surfaces of the second pluralities of reflecting surfaces and without passing through a reflecting surface of said second plurality. This method has for advantage, among others, of being easy to reproduce and of allowing for the obtaining of a precise detector at a cost that remains limited.

BRIEF DESCRIPTION OF THE FIGURES

The purposes, objects, as well as the characteristics and advantages of the invention shall appear better in the detailed description of embodiments of the latter which are shown by the following accompanying drawings wherein:

FIG. 1 shows a possible arrangement of a first and of a second substrates with respect to a matrix of photo detectors, to a channel for the circulation of particles and to at least one optical inlet. The optical paths of incident light rays, scattered and reflected one or several times are shown.

FIGS. 6a to 6l show steps of an example of the method of forming a detector of particles according to the embodiment shown in FIG. 5.

FIG. 7a corresponds to the case where the second substrate comprises a plurality of metallic reflecting surfaces. FIG. 7b corresponds to the case where the second substrate comprises a plurality of lower Bragg mirrors of the $SiN/SiO_2$ type.

Figure 1:
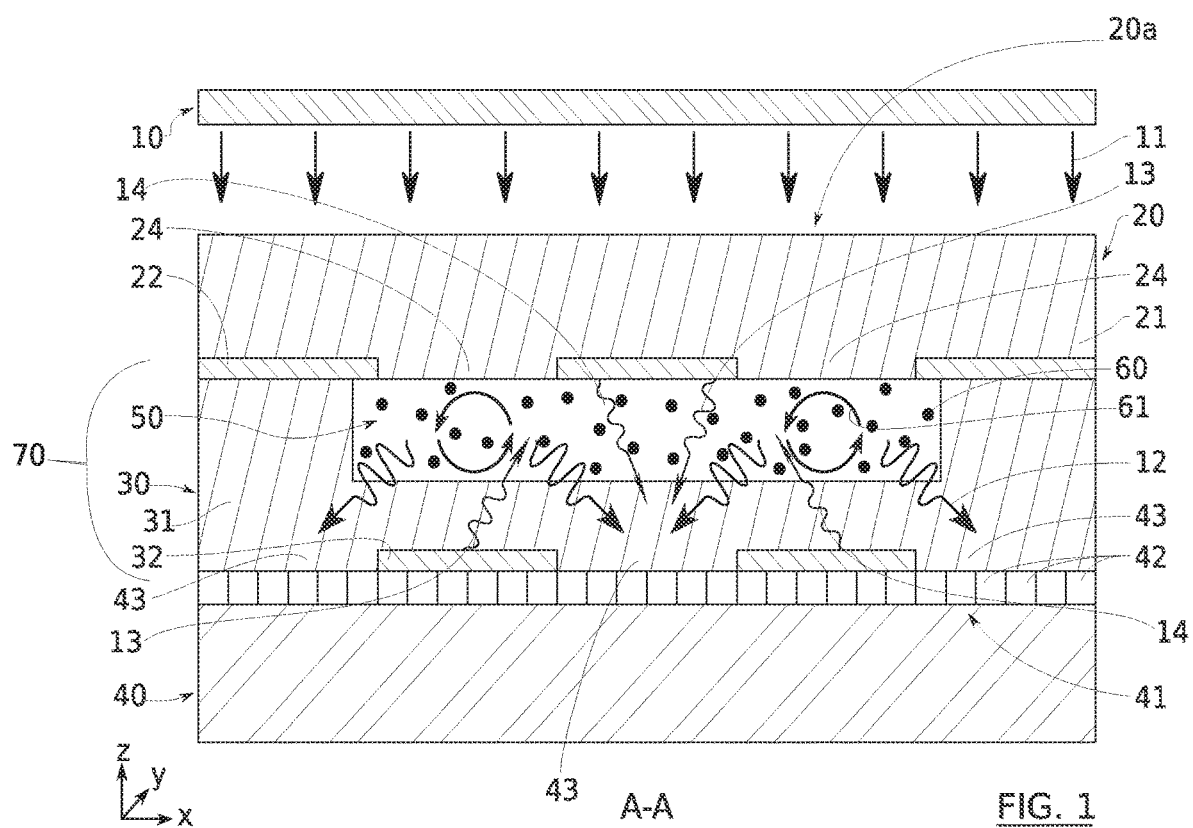
FIG. 1 is a cross-section view along the plane (z, x) of a detector of particles according to a first embodiment of the invention.

The attached drawings are given as examples and do not limit the invention. These drawings are diagrammatical representations and are not necessarily to the scale of the practical application. In particular the relative thicknesses of the various layers, reflecting surfaces, channel, photo detectors and other structures are not representative of reality.

DETAILED DESCRIPTION OF THE INVENTION

In the framework of the present invention, the terms "on", "overmounts", "covers" or "underlying" or the equivalents thereof do not mean "in contact with". Thus for example, the deposition of a first layer on a second layer, does not necessarily mean that the two layers or substrates are directly in contact with one another purpose this means that the first layer covers at least partially the second layer by being either directly in contact with it or being separated from it by at least one other layer or at least one other element.

Unless specifically mentioned otherwise, technical characteristics described in detail for a given embodiment can be combined with the technical characteristics described in the context of other embodiments described as an example an in a non-limiting way.

In the following description, similar reference numbers will be used to describe similar concepts through different embodiments of the invention.

In the following description, an orthonormal coordinate system (x, y, z) is shown in the figures and can be used to define the spatial positions and extensions of the various elements described hereinafter. In the present description, a plane (x, y) is understood as belonging to and designating all of the planes parallel to the plane (x, y) of the coordinate system shown.

In the framework of the present invention, the term "particle", or the equivalents thereof have for definition a constituent of a physical system considered as elementary with respect to the properties studied. For example a particle is an element of material of which the largest dimension is less than the millimetre ($10^{-3}$ metres) and preferably at a few tens of micrometres ($10^{-6}$ metres) and preferably less than the micrometre, even of about a nanometre ($10^{-9}$ metres). Generally, these are objects composed of material of which the dimensions are small with respect to the dimensions of the channel for the circulation of particles.

Preferably in the framework of the present invention, the terms "luminous radiation", "Wave" or "ray" or the equivalents thereof have for definition an electromagnetic flux that has a principal wavelength lambda or a mean wavelength lambda around the principal wavelength with a standard deviation preferably less than or about 20% for example and preferably propagating in a single principal direction or a mean direction around the principal direction with a standard deviation less than or about 10% for example. This direction of propagation is also called "optical path".

In what follows, the terms "diffusion", "diffraction" or the equivalents thereof refer to the phenomenon by which a propagation medium produces a distribution, in many directions, of the energy of an electromagnetic wave, light for example. Thus for example a light ray scattered by a particle is understood as a light ray that has a propagation direction before interaction with the particle that is different from the propagation direction thereof after interaction with the particle.

In what follows, the term "transparency" or the equivalents thereof refer to the phenomenon of allowing a luminous radiation in a transparent material to propagate relatively. In the present description, a material is considered as transparent when it allows at least 50% of a luminous radiation to pass, preferably at least 75% and advantageously at least 90%.

In what follows, the term "reflection" or the equivalents thereof refer to the phenomenon of re-emission from an element or a surface of an incident luminous radiation. In the present description, an element is deemed to be reflective when it re-emits a portion at least of an incident luminous radiation. An element then has a reflection coefficient that varies from 0% for a non-reflecting element to 100% for an element that fully reflects an incident luminous radiation.

It is specified that, in the framework of the present invention, an "upper Bragg mirror" is a device that comprises an alternation of layers of which the materials that have different refraction indexes. This is a multilayer structure wherein at least two layers with a different refraction index alternate a plurality of times, with the number of alternations corresponding to a number of periods P of the Bragg mirror considered, the period P is understood here as the thickness, more preferably in nanometres, of an alternation of layers.

In what follows, the term "blinding" or the equivalents thereof, means a saturation phenomenon of a optical sensor or receiver by one or several light sources.

Before beginning a detailed review of embodiments of the invention, mentioned hereinafter are optional characteristics that may be used in association or alternatively:

Advantageously, the first and second pluralities of reflecting surfaces are arranged in a complementary manner in such a way that all the photo detectors of the matrix arranged in line with the at least one optical inlet according to the principal direction of propagation (z) are masked by at least one reflecting surface of one among the first and the second plurality of reflecting surfaces.

The present invention thus ensures the non-blinding of the photo detectors by the incident luminous radiation, thus making the photo detectors sensitive only to the scattered light rays.

Advantageously, the first and second pluralities of reflecting surfaces are arranged in a complementary manner in such a way that the reflecting surfaces of the first plurality of reflecting surfaces are not arranged in line in the perpendicular direction (z) of the reflecting surfaces of the second plurality of reflecting surfaces.

Thus the first and second pluralities of reflecting surfaces do not have any overlapping zones. This makes it possible to increase the quantity of scattered rays that are captured by the photo detectors.

This complementary arrangement, for example staggered, makes it possible to prevent the photo detectors from being blinded by the incident luminous radiation, the photo detectors receive only the scattered light rays.

Advantageously, the present invention is configured in such a way that a portion at least of the incident luminous radiation is reflected by a portion at least of the second plurality of reflecting surfaces before being scattered by at least one particle.

At least one portion of said first and/or of said second pluralities of reflecting surfaces is carried in part at least by a wall of the channel.

Advantageously, the first and second pluralities of reflecting surfaces are arranged in such a way as to define between them at least one optical cavity, more preferably resonant, with respect to the incident luminous radiation.

According to an advantageous embodiment, the sizing of this optical cavity is carried out in such a way as to make it resonant with respect to the physical parameters of the incident luminous radiation. This optical cavity then becomes a cavity referred to as Fabry-Perot. The present invention then benefits from this wave phenomenon in order to increase the quality of the reading thereof of the diffraction diagram.

In addition, the presence of a resonant optical cavity makes it possible to amplify the incident luminous radiation, commonly referred to as the "pump". Through the proportional relationship that exists between the light intensity of the pump on the channel and the light intensity of the scattered light rays, the use of a resonant optical cavity substantially increases the intensity of the scattered light rays received on the matrix of photo detectors.

The second plurality of reflecting surfaces is configured in such a way as to define between the reflecting surfaces spaces of passage, also designated as optical openings, for the luminous flux. These passage spaces do not include any reflecting surfaces, in such a way that the scattered light rays can pass from the channel to the matrix of photo detectors without passing through a reflecting surface of said second plurality.

The reflecting surfaces of the first plurality of reflecting surfaces are metallic.

The reflecting surfaces of the second plurality of reflecting surfaces are metallic.

The reflecting surfaces of the first plurality of reflecting surfaces have at least one discontinuity in the plane (x, y).

The reflecting surfaces of the second plurality of reflecting surfaces have at least one discontinuity in the plane (x, y).

According to an embodiment, the reflecting surfaces of the first plurality extend principally in a plane and are spaced from one another in this plane in order to arrange between them spaces also designated as openings. The detector is configured in such a way that the incident luminous radiation reaches the channel without passing through any reflecting surface of said first plurality. The incident luminous radiation reaches the channel by passing through the spaces arranged between the reflecting surfaces of said first plurality of reflecting surfaces.

According to an embodiment, the reflecting surfaces of the first plurality of reflecting surfaces extend principally according to a plane (xy) and are spaced from one another in this plane in order to arrange between them openings. The detector is configured in such a way that a portion at least of the incident radiation, i.e. the incident radiation at the level of or on the detector, or more precisely arriving on the plane containing the first plurality of reflecting surfaces, penetrates into the channel by passing through said openings. Thus, this radiation does not pass through the reflecting surface of said first plurality.

The presence of openings makes it possible to increase the number of light rays that reach the channel. This makes it possible to resolve the problem consisting in improving the sensitivity of the detector and the precision of the analysis of the particles.

Moreover, the light rays that pass through the openings penetrate into the channel regardless of their angle of incidence. This makes it possible to resolve the problem consisting in releasing the stresses on the light source and the configuration of the detector as well as on the materials used to form the reflecting surfaces.

According to an embodiment, the detector is configured in such a way that a portion at least of the scattered light rays can pass from the channel to the matrix of photo detectors without passing through any reflecting surface. This makes it possible to resolve the problem consisting in improving the sensitivity of the detector and the precision of the analysis of the particles. This makes it possible to resolve the problem consisting in releasing the stresses on the light source and the configuration of the detector.

According to an embodiment, the detector is configured in such a way that a portion at least of the incident light rays can reach the channel without passing through any reflecting surface. This makes it possible to resolve the problem consisting in improving the sensitivity of the detector and the precision of the analysis of the particles. This makes it possible to resolve the problem consisting in releasing the stresses on the light source and the configuration of the detector as well as on the materials used to form the reflecting surfaces.

Advantageously, the first plurality of reflecting surfaces has a first distribution as a checkerboard patter in a first plane and the second plurality of reflecting surfaces has a second distribution as a checkerboard pattern in a second plane parallel to said first plane, with the first distribution in a checkerboard pattern and the second distribution in a checkerboard pattern being complementary in a direction perpendicular (z) to said first and second planes. Thus the zones occupied by the checkerboard pattern of the first plurality of reflecting surfaces are not arranged in line, in the direction perpendicular (z), of the zones occupied by the checkerboard pattern of the second plurality of reflecting surfaces.

The zones occupied by the checkerboard pattern of the first plurality of reflecting surfaces are arranged in line with the zones that are not occupied by the checkerboard patter of the second plurality of reflecting surfaces.

This makes it possible to form an optical cavity that has at least one optical opening configured to allow the light signal coming from the pump to pass.

The first plurality of reflecting surfaces has a first distribution in strips in a first plane and the second plurality of reflecting surfaces has a second distribution in strips in a second plane parallel to the first plane, with the first distribution in strips and the second distribution in strips being complementary in a direction perpendicular (z) to said first and second planes.

Thus the photo detectors masked by the strips of one of the pluralities of reflecting surfaces are not masked by the other strips of the other plurality of reflecting surfaces.

Preferably all the photo detectors are masked by one or the other of the pluralities of reflecting surfaces.

According to a particular embodiment, certain photo detectors are not located in line with a reflecting surface of the first plurality of reflecting surfaces, nor are they located in line with a reflecting surface of the second plurality of reflecting surfaces.

In this case, they can be blinded by the incident flux. In order to suppress this disadvantage it is possible during the subsequent treatment to not take into account the signal delivered by these blinded photo detectors.

According to an advantageous embodiment, the detector according to the present invention comprises at least one upper Bragg mirror, preferably extending in a plane parallel to a principal plane (x, y), and arranged between the first plurality of reflecting surfaces and the channel.

This makes it possible to form a resonant optical cavity referred to as Fabry-Pérot so as to amplify the incident luminous radiation called pump and thus to consequently amplify the light flux, coming from the scattered light rays, received on the matrix of photo detectors.

According to another embodiment, the detector according to the present invention comprises at least one upper Bragg mirror, preferably extending in a plane parallel to a principal plane (x, y), and arranged between the optical inlet and the first plurality of reflecting surfaces.

According to an advantageous embodiment, the second plurality of reflecting surfaces comprises a plurality of lower Bragg mirrors, with each lower Bragg mirror being located preferably in line with the optical inlet.

Advantageously, each lower Bragg mirror is spaced from each other lower Bragg mirror of the plurality of lower Bragg mirrors, in such a way as to form at least one optical opening between them.

Advantageously, each upper Bragg mirror is spaced from each other upper Bragg mirror of the plurality of upper Bragg mirrors, in such a way as to form at least one optical opening between them.

Advantageously, the thickness of the upper Bragg mirror is less than the thickness of the plurality of lower Bragg mirrors, with the thicknesses being measured according to the perpendicular direction (z).

Advantageously, the reflection coefficient of the upper Bragg mirror is less than the reflection coefficient of the plurality of lower Bragg mirrors with respect to said scattered light rays.

Advantageously, the upper Bragg mirror has a first period and the plurality of lower Bragg mirrors has a second period, with the first period being equal to the second period.

Advantageously, the upper Bragg mirror has a first number of periods and the plurality of lower Bragg mirrors has a second number of periods, with the first number of periods being less than the second number of periods.

Advantageously, the channel is delimited, more preferably in the plane (z, x), in part at least by a first substrate and a second substrate, with the first substrate comprising at least the first plurality of reflecting surfaces, with the second substrate comprising at least the second plurality of reflecting surfaces.

According to an advantageous embodiment, the detector of the present invention forms a stack of layers, said stack comprising at least one first substrate, a second substrate and a third substrate, with the first substrate comprising at least the first plurality of reflecting surfaces, with the second substrate comprising at least the second plurality of reflecting surfaces and more preferably a portion of the channel and the third substrate comprising at least the matrix of photo detectors, the channel being delimited, more preferably in the plane (z, x), in part at least by the first and the second substrates.

The present invention has for a preferred domain the application of the detection of particles of various sizes, more preferably in the field of microscopic and even nanometric particles.

For example the present invention can be used for the detection of particles coming from smoke, polluting particles, particles of dust, particles of allergens such as pollens, spores of moulds, or carcinogenic particles, or biological particles such as bacteria, viruses, or exosomes.

The present invention applies to any type of particles conveyed by a fluid, whether the latter is liquid and/or gaseous.

The present invention shall be described hereinbelow in reference to three non-limiting embodiments that can be combined as needed and each one having a plurality of alternatives.

A first embodiment of the invention shall now be described in reference to FIG. 1 which shows a cross-section view of a stack that comprises a first substrate 20, a second substrate 30 and a third substrate 40.

The first substrate 20, the second substrate 30 and the third substrate 40 each extend principally in planes parallel to a principal plane (x, y).

Advantageously, the first substrate 20 and the second substrate 30 define a channel 50 intended to receive a fluid conveying particles 60.

According to an embodiment the channel 50 extends according to a principal direction (y) contained in the principal plane (x, y) for example. It can be provided to set the fluid in motion. The latter, as well as the particles 60 are thus displaced principally according to said principal direction.

In order to carry out the detection of particles 60 present in the channel 50, an optical device 10 is provided configured to emit an incident luminous radiation 11 and a matrix 41 of photo detectors 42 arranged on either side of a portion at least of the channel 50.

According to the non-limiting embodiment shown in FIG. 1, the incident luminous radiation 11 propagates according to a direction perpendicular (z) to the principal plane (x, y). In this figure the matrix 41 of photo detectors 42 is carried by the third substrate 40. Thus the optical device 10 and the matrix 41 of photo detectors 42 are arranged on either side of the first 20 and second 30 substrates.

The first substrate 20 comprises at least one optical inlet 20a defined for example by a face of the first substrate 20 located facing the optical device 10 in such a way that the incident luminous radiation 11 emitted from the optical device 10 penetrates into the first substrate via the optical inlet 20a.

Advantageously, the first substrate 20 comprises a first transparent medium 21 comprising at least one transparent material with respect to incident luminous radiation 11.

In such a way as to generate the incident luminous radiation 11, the optical device 10 can for example include a matrix of light-emitting diodes, a one-off light source or a laser source.

The first substrate 20 comprises on a face opposite the optical inlet 20a at least one first plurality of reflecting surfaces 22. These reflecting surfaces advantageously comprise at least one reflecting material with respect to the incident luminous radiation 11.

These reflecting surfaces 22 define between them optical passages 24 also designated as spaces, allowing the light rays to pass without passing through said reflecting surfaces 22. These optical passages 24 devoid of reflecting surfaces 22 extend preferably in a plane (x, y), and preferably in the same plane (x, y) as the reflecting surfaces 22. Thus, the incident radiation 11, i.e. the radiation that reaches the detector or that reaches the plane (x, y) containing the first plurality of reflecting surfaces, can penetrate into the channel 50 without passing through any reflecting surface.

The presence of optical openings 24 makes it possible to increase the number of light rays that reach the channel 50. Consequently, the detector according to the invention makes it possible to improve the sensitivity of the detector and the precision of the analysis of the particles.

Moreover, the incident luminous radiation that passes through the openings 24 penetrates into the channel 50 regardless of its angle of incidence. Consequently, the detector according to the invention makes it possible to release the stresses on the light source and the configuration of the detector as well as on the materials used to form the reflecting surfaces. For example, it can be provided that the latter be made of metal.

The second substrate 30 comprises, preferably, a first face defining a portion of the channel 50 and a second face opposite the first face. The second plurality of reflecting surfaces 32 is located on this second face.

As for the first plurality of reflecting surfaces 22, the second plurality of reflecting surfaces 32 advantageously comprises at least one reflecting material with respect to the incident luminous radiation 11. The reflecting surfaces 32 extend in a plane (x, y) and have between them optical passages 43 also designated as spaces 43, allowing the light rays to pass without passing through said reflecting surfaces 32. These optical passages 43 devoid of reflecting surfaces 32 extend preferably in the same plane (x, y) as the reflecting surfaces 32. Thus, the scattered radiation 12 that reaches the matrix of photo detectors from the channel 50, does not pass through any reflecting surface.

The presence of the optical passages 43 makes it possible to increase the number of light rays that reach the channel 50. Consequently, the detector according to the invention makes it possible to improve the sensitivity of the detector and the precision of the analysis of the particles.

Moreover, the scattered light that pass through the optical passages 43 reach from the channel 50 and to the matrix of photo detectors regardless of their angles of incidence. Consequently, the detector according to the invention makes it possible to release the stresses on the configuration of the detector as well as on the materials used to form the reflecting surfaces. For example, it can be provided that the latter be made of metal.

The second substrate 20 advantageously comprises a second transparent medium 31 comprising at least one transparent material with respect to incident luminous radiation 11, to scattered light rays 12, to scattered light rays and reflected a first time 13, and to scattered light rays and reflected several times 14.

The third substrate 40 comprises on a first face the matrix 41 of photo detectors 42. These photo detectors 42 are advantageously configured to detect at least one luminous radiation of which the wavelength is substantially equal to the wavelength of the incident luminous radiation 11. This matrix 41 of photo detectors 42 is configured to detect the scattered light rays 12, scattered and reflected a first time 13 and scattered and reflected several times 14.

This matrix 41 of photo detectors 42 is arranged facing the second plurality of reflecting surfaces 32 and of the first plurality of reflecting surfaces 22.

Thus, according to this first embodiment, the optical device 10 and the third substrate 40 carrying the matrix 41 of photo detectors 42 are located on either side of the first 20 and second 30 substrates.

Particularly advantageously, the first 22 and second 32 pluralities of reflecting surfaces are arranged on either side of the channel 50.

Preferably, the first 22 and second 32 pluralities of reflecting surfaces are arranged staggering in the perpendicular direction (z).

According to a preferred embodiment, the first plurality of reflecting surfaces 22 and the second plurality of reflecting surfaces 32 are arranged in a complementary manner in the perpendicular direction (z). This complementary arrangement corresponds to an arrangement of the first plurality of reflecting surfaces 22 with respect to the second plurality of reflecting surfaces 32 in such a way that the photo detectors 42 of the matrix 41 do not directly receive the incident luminous radiation 11.

According to this arrangement, only scattered light rays 12, scattered and reflected a first time 13 and scattered and reflected several times 14 can reach the matrix 41 of photo detectors 42.

In order to achieve this complementarity according to the perpendicular direction (z), the first 22 and second 32 pluralities of reflecting surfaces can each comprise a particular spatial arrangement of their reflecting surfaces. For example, this spatial arrangement can take the form of a checkerboard pattern or of strips extending in the same direction and having a distribution in the periodic principal plane (x, y).

According to an embodiment, the first plurality of reflecting surfaces 22 can represent a surface greater than or less than the second plurality of reflecting surfaces 32, more preferably while still retaining a complementarity according to the perpendicular direction (z).

According to another embodiment, the first plurality of reflecting surfaces 22 comprises or is comprised of at least one ring and the second plurality of reflecting surfaces 32 comprises or is comprised of at least one disc of a greater or equal diameter, more preferably not more than 10%, of the inner diameter of said at least one ring, with the centres of the ring of the disc being arranged on the same line parallel to the axis z.

Figure 2:
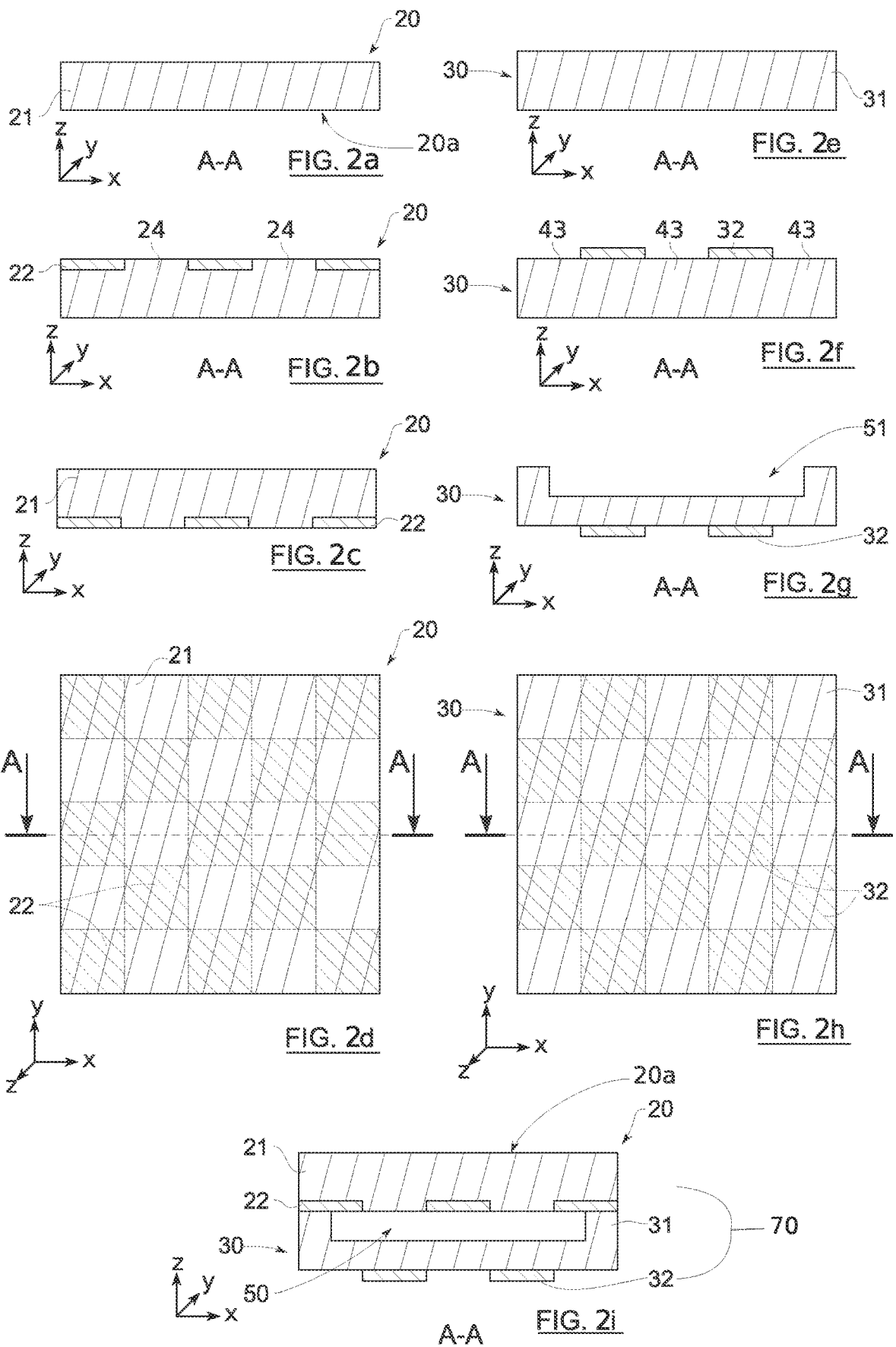
FIGS. 2a to 2i show steps of an example of the method of forming a detector of particles according to the embodiment shown in FIG. 1.

The spatial arrangements in the principal plane (x, y) of the first 22 and of the second 32 pluralities of reflecting surfaces each have a frequency in phase opposition one relative to the other in such a way as to achieve this complementarity. An example of complementarity in the form of a checkerboard pattern is shown in FIGS. 2d and 2h.

This complementarity makes it possible to form an optical cavity 70. Indeed, this optical cavity 70 is delimited by the first 22 and second 32 pluralities of reflecting surfaces. Thus, the cavity 70 comprises for example the portion of the channel 50 as well as the portions of substrate 20, 30 located between the first 22 and second 32 pluralities of reflecting surfaces. According to an embodiment, the first 22 and the second 32 pluralities of reflecting surfaces are arranged staggered. Thus, the zones occupied by the reflecting surfaces of the first plurality 22 of reflecting surfaces are not located in line, typically in the perpendicular direction (z), of zones occupied by the reflecting surfaces of the second plurality 32 of reflecting surfaces and inversely.

According to an embodiment, the photo detectors 42 are all arranged in line with at least one reflecting surface taken from among the first 22 and the second 32 pluralities of reflecting surfaces. Thus, all the photo detectors are masked by a reflecting surface. They do not receive any incident light coming from the optical inlet 20a that was neither scattered nor reflected. This embodiment is shown in FIG. 1.

According to another embodiment, some of the zones occupied by the reflecting surfaces of the first plurality of reflecting surfaces 22 are located in part at least in line with certain zones occupied by the reflecting surfaces of the second plurality of reflecting surfaces 32. There can thus be a partial overlapping of zones occupied by the reflecting surfaces.

According to an embodiment, the first 22 and second 32 pluralities of reflecting surfaces have according to the perpendicular direction (z) an overlapping less than 50% of their surface, more preferably less than 25% and advantageously they have no overlapping according to the perpendicular direction (z).

According to another embodiment, certain photo detectors 42 are arranged in line with no reflecting surface. They can then receive the incident light. In this case, it is then provided to reprocess the information acquired by these sensors, for example by eliminating the signal that they receive. According to this embodiment, these photo detectors 42 can moreover make it possible to measure the magnitude of the power of the pump and for example compare it with the scattered signals.

In order to present in a simple manner the embodiment wherein the reflecting surfaces do not overlap and cover all the photo detectors 42 located in line with the optical inlet 20a, the optical path of an incident luminous radiation 11 shall now be described.

The incident luminous radiation 11 once emitted from the optical device 10 according to the perpendicular direction (z) penetrates into the first substrate 20 on the optical inlet 20a.

The incident luminous radiation 11 then passes through the first transparent medium 21 of the first substrate 20, passes through at least one optical passage 24 delimited by the reflecting surfaces 22 and reaches the channel 50. Once in the channel 50, the incident luminous radiation 11 encounters at least one particle 60 before and/or after having been reflected one or several times by the first plurality of reflecting surfaces 22 and/or the second plurality of reflecting surfaces 32.

Advantageously, the interaction between the incident luminous radiation 11, reflected or not, with at least one particle 60 generates at least one scattered light ray 12.

This scattered light ray 12 can then reach the matrix 41 of photo detectors 42 via the second transparent medium 31 directly or after one or several reflections off the first plurality of reflecting surfaces 22 and/or the second plurality of reflecting surfaces 32 and by passing through optical openings 43 defined by the spaces between the reflecting surfaces of the second plurality of reflecting surfaces 32. The set of scattered rays 12, 13 and 14 reaching the matrix 41 of photo detectors 42 thus makes it possible to form a diffraction diagram, advantageously two-dimensional.

Those skilled in the art are then able to deduce information with respect to these particles 60 on the basis of the diffraction diagram obtained thanks to the matrix 41 of photo detectors 42.

To this effect, those skilled in the art can for example refer to the following articles: "The Mie Theory: Basics and Applications"; Wolfram Hergert, Thomas Wriedt; Springer, 30 Jun. 2012-259 pages or "Light scattering and surface plasmons on small spherical particles", Xiaofeng Fan, Weitao Zheng and David J Singh, Light Science & Applications (2014) 3 or J. R. Hodkinson and I. Greenleaves, "Computations of Light-Scattering and Extinction by Spheres According to Diffraction and Geometrical Optics, and Some Comparisons with the Mie Theory", Journal of the Optical Society of America 53, 577 (1963).

According to the embodiment wherein the photo detectors 42 are in line with at least one reflecting surface, in the absence of particles 60 in the channel 50, no scattered light ray is generated, when the matrix 41 of photo detectors 42 does not more preferably detect any luminous radiation. This case corresponds to the ideal case. Indeed, it has been observed during the development of the present invention that there is a parasite scattered radiation in the absence of particles 60 in the channel 50. This parasite scattered radiation was identified as coming from the diffraction of the incident luminous radiation 11 via the imperfections, in particular via the roughness, interfaces that separate the various propagation mediums of the incident luminous radiation 11. In order reduce, and even overcome, this parasite scattered radiation, the present invention utilise a plurality of lithography and etching techniques so as to reduce the roughness of these interfaces.

Through FIGS. 2a to 2i, an example of the method for producing the detector of particles shown in FIG. 1 shall now be described.

In a simplified manner, this method comprises at least the following steps:

supplying a first substrate 20 extending in the principal plane (x, y) and comprising a first transparent medium 21 with respect to the incident luminous radiation 11, with this first substrate 20 comprising a first surface intended to be used as an optical inlet 20a;

forming a first plurality of reflecting surfaces 22 on a second surface of the substrate 20 opposite the first surface;

supplying a second substrate 30 also extending in the principal plane (x, y) and comprising a second transparent medium 31 with respect to the incident luminous radiation 11, this second substrate 30 comprising a first surface intended to form at least one portion of the channel 50 and comprising on a second surface of the substrate 30 a second plurality of reflecting surfaces 32;

assembling the first substrate 20 and the second substrate 30 in such a way that the optical inlet 20a and the second plurality of reflecting surfaces 32 are situated on either side of the first plurality of reflecting surfaces 22 and of the channel 50 defined by the cooperation of the first substrate 20 and of the second substrate 30 forming the channel 50 for the circulation of particles 60.

These steps are detailed hereinbelow.

FIG. 2a shows the first substrate 20 advantageously comprising a first transparent medium 21. Preferably, this first substrate 20 comprises silicon oxide and advantageously glass. The first surface of this first substrate 20 is intended to form the optical inlet 20a, this is an interface, more preferably plane, between the first transparent medium 21 and the external environment. This surface is more preferably intended to be turned facing the optical device 10.

FIG. 2b shows the formation of the first plurality of reflecting surfaces 22 extending in the principal plane (x, y) on a surface opposite the optical inlet 20a. The formation of the first plurality of reflecting surfaces 22 comprises a step of deposition of a layer, more preferably metallic, made of aluminium for example, followed by a step of structuring via etching of this metal layer in such a way as to form the first plurality of reflecting surfaces 22. This step of structuring consists principally in forming a checkerboard pattern for example or a series of strips parallel to one another. This step of structuring therefore comprises the definition of a first periodic network of reflecting surfaces distributed in the principal plane (x, y).

This structuring is then followed by a step of deposition of an oxide, of silicon for example, so as to fill in the spaces between each reflecting surface 22. This step allows for the levelling of this face of the first substrate 20. The spaces between each reflecting surface 22 form optical passages 24.

Advantageously, steps are carried out in order to improve the quality of this surface by reducing the roughness thereof to a minimum.

Preferably, a step of planarization via mechanical-chemical polishing for example is carried out. This planarization makes it possible to reduce the surface roughness in such a way that the interfaces between the first substrate 20 and the environment are the most abrupt possible in such a way as to reduce the phenomenon of parasitic diffraction at the interfaces when the incident luminous radiation 11 passes through these interfaces.

FIG. 2c shows the turning over of the first substrate 20 according to the direction (x).

FIG. 2d shows a top view of the first substrate 20. In this example, the first plurality of reflecting surfaces 22 was structured in such a way as to form a first checkerboard pattern. This first checkerboard pattern is therefore comprised of reflecting surfaces 22 and of optical openings 24.

FIG. 2e shows the second substrate 30 also extending in the principal plane (x, y) and advantageously comprising a second transparent medium 31. Preferably, this second substrate 30 also comprises silicon oxide and advantageously glass. A first surface of this second substrate is intended to form a portion at least of the channel 50.

FIG. 2f shows the formation of the second plurality of reflecting surfaces 32 on a second surface of the second substrate 30 opposite the first surface. The formation of the second plurality of reflecting surfaces 32 comprises a step of deposition of a layer more preferably metallic, made of aluminium for example, followed by a step of structuring via etching of this metal layer in such a way as to form the second plurality of reflecting surfaces 32.

As for the structuring of the first plurality of reflecting surfaces 22, this step of structuring consists principally in forming a checkerboard pattern or a series of strips parallel between them, alternating reflecting surfaces 32 and optical openings 43. This step of structuring therefore comprises the definition of a second periodic network of reflecting surfaces extending in the principal plane (x, y).

Advantageously and identically to the case of the first plurality of reflecting surfaces 22, this structuring can then be followed by a step of deposition, of a silicon oxide for example, so as to fill in the spaces between each reflecting surface 32. With a concern for concision, this optional step is not shown, nor the optional step of planarization by mechanical-chemical polishing providing the same advantages as those described hereinabove. The spaces between each reflecting surface 32 form optical openings 43.

FIG. 2g shows the turning over of the second substrate 30 according to the direction (x), as well as the formation of a portion 51 of the channel 50. This formation can advantageously be carried out via etching through a hard mask or a resin mask.

FIG. 2h shows a top view of the second substrate 30. In this example, the second plurality of reflecting surfaces 32 was structured in such a way as to form a second checkerboard pattern.

Advantageously, the first checkerboard pattern and the second checkerboard pattern are complementary according to the perpendicular direction (z). This spatial complementarity results in a phase opposition of the first periodic network with respect to the second periodic network. FIGS. 2d and 2h show this complementarity.

According to an embodiment, the first periodic network and the second periodic network can be circular, concentric, form a spiral or any other geometrical forms, having a complementarity according to the perpendicular direction (z).

FIG. 2i shows the assembly, via molecular gluing for example, of the first substrate 20 with the second substrate 30.

Particularly advantageously, this assembling is carried out in such a way that the first substrate 20 defines with the portion 51 of the channel 50 carried by the second substrate 30, the channel 50 for the circulation of particles 60. In this example, this channel 50 has a closed periphery in the plane (z, x). It extends principally according to the direction y.

The arrangement of a matrix 41 of photo detectors 42 facing the second plurality of reflecting surfaces 32 and of an optical device 10 facing the optical inlet 20a makes it possible to form the detector of particles 60 according to this first embodiment of the present invention.

A second embodiment of the invention shall now be described in reference to FIG. 3. This embodiment has in particular the advantage of amplifying the signal measured by the matrix 41 of photo detectors 42 via the use of a Bragg mirror.

Figure 3:
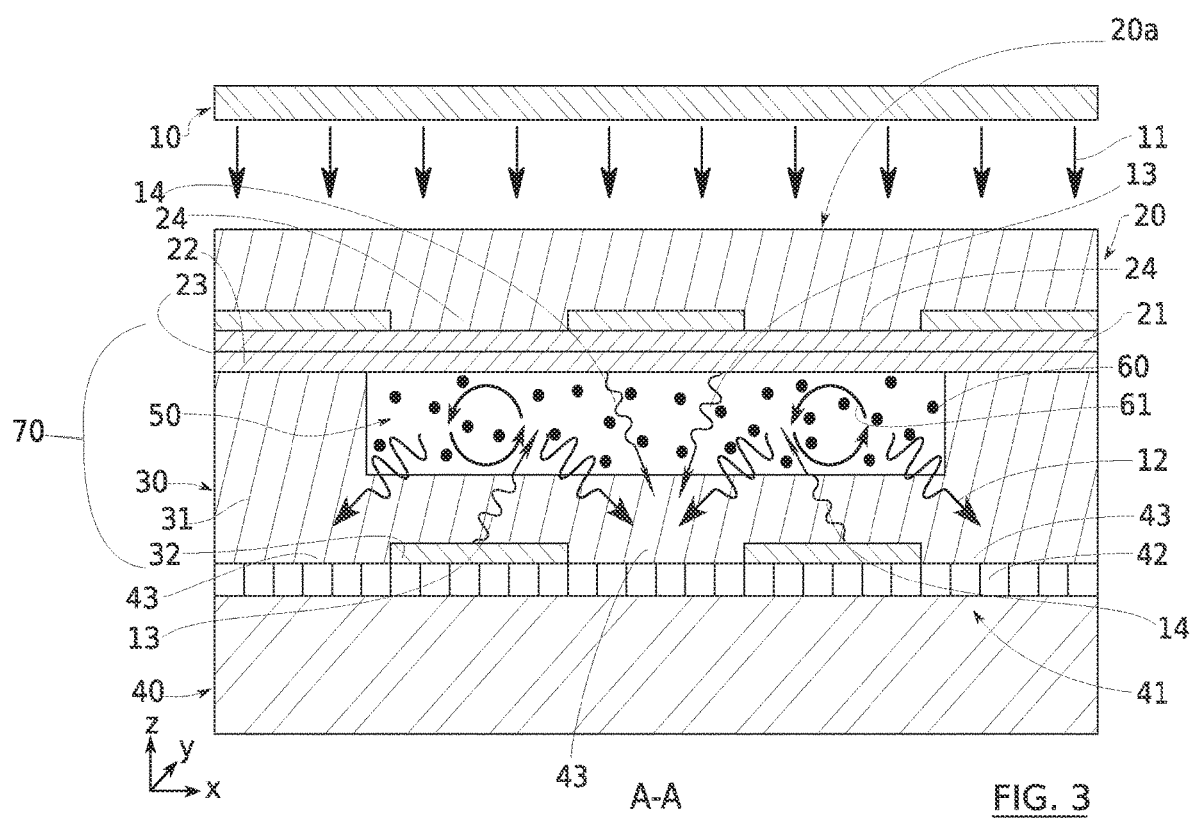
FIG. 3 is a cross-section view in the plane (z, x) of a detector of particles according to a second embodiment of the invention. In this FIG. 3, the possible positioning of an upper Bragg mirror with respect to all of the elements previously present in FIG. 1 is shown.

Identically to the preceding FIG. 1, FIG. 3 shows a cross-section view of a stack comprising a first substrate 20, a second substrate 30 and a third substrate 40, all extending in planes parallel to the principal plane (x, y).

This second embodiment is distinguished from the first mode described hereinabove, by the presence of at least one upper Bragg mirror 23 located preferably between the channel 50 and the first plurality of reflecting surfaces 22.

Preferably but in a non-limiting manner, the upper Bragg mirror 23 covers all of the first plurality of reflecting surfaces 22.

According to another embodiment, the upper Bragg mirror 23 is located between the optical inlet 20a and the first plurality of reflecting surfaces 22.

Thus, the use of an upper Bragg mirror 23 makes it possible to produce an optical cavity 70, more preferably resonant, containing a portion at least of the channel 50. This optical cavity 70 is delimited by the first plurality of reflecting surfaces 22, more preferably by the upper Bragg mirror 23, and by the second plurality of reflecting surfaces 32.

This optical cavity 70 makes it possible to amplify the incident luminous radiation 11 on the channel 50. Indeed, this optical cavity 70 can be assimilated to a Fabry-Pérot cavity. In the rest of the description, the term "pump signal" will be used to describe the incident luminous radiation 11 when the latter is in the optical cavity 70. This term is borrowed from the field of laser optics and of optical cavities of the Fabry-Pérot type.

In commonly used terms in this particular field of optics, the presence of an upper Bragg mirror 23 provides an amplification of the pump signal. The scattered signal, measured by the photo detectors 42 and corresponding to the scattered rays 12, 13 and 14, is proportional to this pump signal. Therefore, the upper Bragg mirror 23 allows for an amplification of the scattered signals and therefore of the sensitivity of the detector of particles according to the present invention.

This amplification then leads to a better measurement of the diffraction diagram and therefore to a more qualitative analysis of the particles 60 present in the channel 50.

In this configuration, this reverts to artificially increasing the distance travelled by the light rays located inside the optical cavity 70 and thus to multiplying the number of interactions with the particles 60.

Indeed, when there is a single passage of the light rays in the optical cavity 70, all of the particles 60 are scattered, but weakly. If the light rays pass N times in the optical cavity 70, all of the particles will scatter about N times more (with attenuation near the pump after each passage).

Advantageously, in the case of one or of several passages of light rays in the optical cavity 70, all or almost all of the particles 60, present in the optical cavity 70, participate in the scattering phenomenon.

Particularly cleverly, the upper Bragg mirror 23 is advantageously configured in such a way as to produce a critical coupling that maximises the absorption of the incident light ray 11 by the optical cavity 70 by maximising the scattering in the channel 50 by the particles 60.

The term "critical coupling" means a relationship between the concentration of the particles, type of particles and reflectivity of the Bragg mirror which makes it possible to store and amplify the light in the optical cavity 70 sufficiently effectively so that it ends up being entirely scattered. The influence of the reflectivity of the Bragg mirror can be illustrated in the following way: in the case of an optical cavity said to be excessively resonant, i.e. when the upper Bragg mirror 23 is very thick, therefore highly reflective, little light enters per unit of time into the optical cavity 70, and if the scattering losses are substantial in the optical cavity 70, i.e. if there are many particles, then the little light that enters does not have the time to be amplified. In this situation, there is therefore no increase in the scattering, and therefore most of the light is reflected off the upper Bragg mirror 23.

In the case where the optical cavity 70 is said to be excessively not resonant, i.e. when the upper Bragg mirror 23 is thin, the light rapidly enters into the optical cavity 70, but it also exits rapidly, before having been able to be sufficiently amplified to be highly scattered.

Thus, there is an optimum intermediate regime, referred to as "critical coupling", where the reflectivity of the upper Bragg mirror 23, i.e. its thickness, is adapted to the number of particles in the optical cavity 70 in order to store and amplify the light in the optical cavity 70 enough so that it ends up by being fully scattered. This critical coupling thus allows all of the incident light to be scattered by the particles.

In order to carry out this critical coupling, the sizing of the upper Bragg mirror 23 can be determined by those skilled in the art via various computer tools or through various scientific works or publications of which for example O. S. Heavens "Optical Properties of Thin Films" Butterworth, London (1955).

In order to present in a simple manner this second embodiment as we have done for the first, the optical path of the incident luminous radiation 11 shall be described.

The incident luminous radiation 11 penetrates into the first substrate 20 on the optical inlet 20a. The incident luminous radiation 11 then passes through the first transparent medium 21 and the upper Bragg mirror 23.

Once the upper Bragg mirror 23 is passed through, the incident luminous radiation 11 follows the same route as in the first embodiment described hereinabove, other than the fact that is can undergo, as well as the scattered light rays 12, 13 and 14, one or several reflections on upper Bragg mirror 23.

In order to allow for the amplification of the pump signal, the upper Bragg mirror has a thickness, therefore a reflectivity that is optimised to maximise the amplification of the pump signal inside the optical cavity 70 which is resonant with respect to the incident luminous radiation 11.

Through FIGS. 4a to 4i, an example of the method of producing a detector of particles according to the embodiment of FIG. 3 shall now be described.

This method comprises the same steps as that of the first embodiment, except that it comprises the formation of the upper Bragg mirror 23.

In a simplified manner this method comprises at least the following steps:
providing a first substrate 20 comprising a first transparent medium 21 and an optical inlet 20a;
forming a first plurality of reflecting surfaces 22;
forming an upper Bragg mirror 23 above the first plurality of reflecting surfaces 23;
providing a second substrate 30 identical to that of the first embodiment and structuring it identically so as to form the second plurality of reflecting surfaces 32 and a portion of the channel 50.
assembling the first substrate 20 and the second substrate 30 in such a way that the optical inlet 20a and the second plurality of reflecting surfaces are situated on either side of the first plurality of reflecting surfaces 22, of the upper Bragg mirror 23 and form the channel 50.

These steps are detailed hereinbelow.

Figure 4:
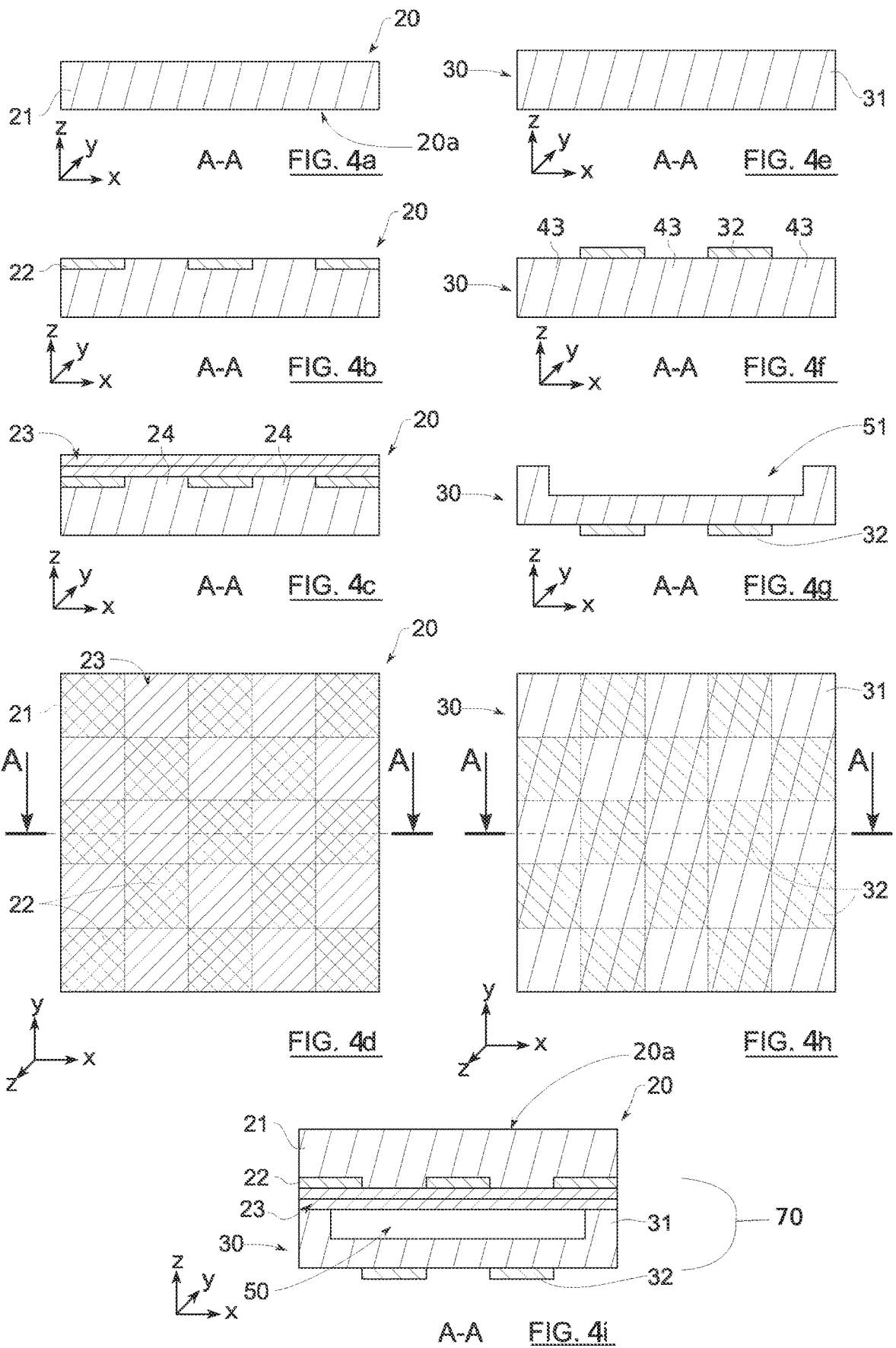
FIGS. 4a to 4i show steps of an example of the method of forming a detector of particles according to the embodiment shown in FIG. 3.

FIGS. 4a and 4b show the same steps as FIGS. 2a and 2b of the first embodiment.

FIG. 4c shows the formation of the upper Bragg mirror 23 extending in the principal plane (x, y). This step of formation comprises at least the deposition of a multilayer structure comprising an alternation of at least two materials.

Advantageously, the materials are selected according to their refraction index with respect to the wavelength of the incident luminous radiation 11. Thus, for example, in the case of an incident luminous radiation 11 in the visible spectral range, an alternation of SiN and of $SiO_2$ will be chosen for example, or of TiO2 and of $SiO_2$. The refraction index of the SiN is about 2, that of the $SiO_2$ is 1.5, that of the $TiO_2$ is 2.5 in the visible spectral range. In the near infrared spectral range, an alternation of amorphous silicon and of silica will be chosen for example.

Preferably, the formation of the upper Bragg mirror 23 comprises a solid plate deposition. Indeed, the upper Bragg mirror 23 extends preferably in the principal plane (x, y) over tall of the surface of the first plurality of reflecting surfaces 22, and potentially over all of the first substrate 20 opposite the optical inlet 20a.

According to an embodiment, the formation of the upper Bragg mirror 23 comprises the formation of a plurality of upper Bragg mirrors arranged, either directly above the plurality of reflecting surfaces 22, or between each one of the reflecting surfaces of the plurality of reflecting surfaces 22, in a complementary manner.

FIG. 4d shows a top view of the second substrate 20. Particularly advantageously, the first plurality of reflecting surfaces 22 was structured in such a way as to form a first checkerboard pattern and the upper Bragg mirror 23 covers all of the first plurality of reflecting surfaces 22.

FIGS. 4e to 4h show the same steps as those described hereinabove in FIGS. 2e to 2h.

FIG. 4i shows the assembly, via molecular gluing for example, of the first substrate 20 with the second substrate 30.

Particularly advantageously, this assembling is carried out in such a way that the optical inlet 20a and the second plurality of reflecting surfaces 32 are located on either side of the channel 50, of the first plurality of reflecting surfaces 22 and of the upper Bragg mirror 23.

A third embodiment of the invention shall now be described in reference to FIG. 5. This embodiment has among others the advantage of amplifying much more effectively the scattered signal measured by the matrix 41 of photo detectors 42 than the preceding embodiment and this via the use of the upper Bragg mirror 23 and of a plurality of lower Bragg mirrors 33.

Figure 5:
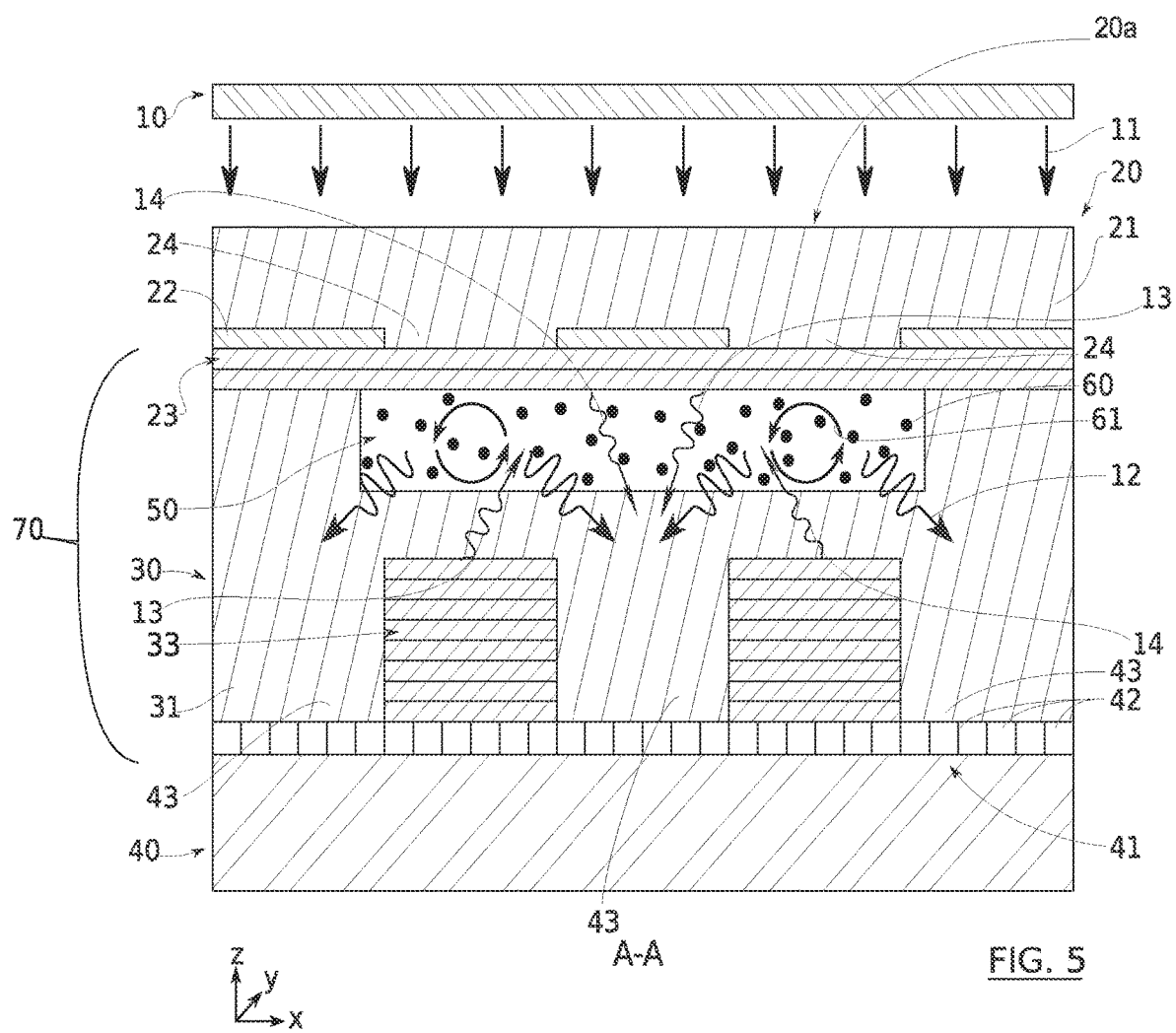
FIG. 5 is a cross-section view in the plane (z, x) of a detector of particles according to a third embodiment of the invention. According to this third embodiment, the second substrate comprises a plurality of lower Bragg mirrors.

Identically to the preceding FIG. 3, FIG. 5 shows a cross-section view of a stack comprising a first substrate 20, a second substrate 30 and a third substrate 40.

This third embodiment is distinguished from the preceding one by the presence of a plurality of lower Bragg mirrors 33 located between the channel 50 and the matrix 41 of photo detectors 42. Preferably, these lower Bragg mirrors 33 act as a second plurality of reflecting surfaces 32. In particular, these lower Bragg mirrors 33 extend according to the same plane (x, y) by defining optical openings 43 between them, in such a way that the light rays pass from the channel 50 to the matrix 41 of photo detectors 42 without passing through the lower Bragg mirror 33.

In this embodiment, the use of a plurality of lower Bragg mirrors 33 makes it possible to increase the performance of the preceding optical cavity 70. Indeed, contrary to the metallic reflecting surfaces of the second plurality of reflecting surfaces 32 present in the two embodiments described hereinabove, the plurality of lower Bragg mirrors 33 has very low, and even no, losses via absorption. Thus, in this third embodiment, the second plurality of reflecting surfaces 32 comprises and more preferably is formed by the plurality of lower Bragg mirrors 33.

According to this third embodiment, the amplification of the pump signal is then increased, the same therefore applies for the scattered signal measured on the matrix 41 of photo detectors 42.

In addition, during the development of the present invention and the perfecting of this third embodiment, it was surprisingly observed that using a plurality of lower Bragg mirrors 33 having a reflectivity greater than that of the upper Bragg mirror 23 makes it possible to reach a relationship between the pump signal and the scattered signal close to 1. This is all the more so manifest when the Bragg mirrors of the plurality of lower Bragg mirrors 33 have a total reflectivity, i.e. without loss by absorption. This relationship between the pump signal and the scattered signal can theoretically be independent of the concentration and of the type of particles 60, in this case it is a function only of the properties of the optical cavity 70.

However, for a given optical cavity, there will be a scattering referred to as total, i.e. a critical coupling, for a certain concentration and a certain type of particles. But for another concentration and a very different type of particles, this will require a different optical cavity, i.e. comprising a thinner or thicker upper Bragg mirror, to again have a total scattering.

Thus, according to the application under consideration, and therefore of the type of particles and of the typical concentrations to be detected, the upper Bragg mirror will be adapted to be at the critical coupling.

The optical path of an incident luminous radiation 11 emitted by the optical device 10 in the framework of this third embodiment is identical to that of the preceding embodiment, with the exception that the incident luminous radiation 11 is reflected in part at least by the upper Bragg mirror 23 and by the plurality of lower Bragg mirrors 33. These multiple reflections are advantageous so as to amplify the scattered signal measured by the matrix 41 of photo detectors 42.

An example of the method of producing a detector of particles 60 according to this third embodiment will now be described through FIGS. 6a to 6l.

This method comprises the same steps as that of the second embodiment with regards to the first substrate 20 and the structuring thereof. Concerning the second substrate 30, the formation and the structuring thereof require new steps with respect to the method of the second embodiment.

In a simplified manner these new steps are the following:
providing a second substrate 30 identical to the one of the second embodiment and structuring it in such a way as to form a plurality of lower Bragg mirrors 33 and a portion at least of the channel 50;
assembling the first substrate 20 and the second substrate 30 in such a way that the optical inlet 20a and the plurality of lower Bragg mirrors 33 are situated on either side of the first plurality of reflecting surfaces 22, of the upper Bragg mirror 23 and of the channel 50.

These steps are detailed hereinbelow.

FIGS. 6a to 6e show the same steps as FIGS. 2a to 2e of the first embodiment.

FIG. 6f shows the formation of a solid plate lower Bragg mirror 34 on a face of the third substrate 30. This step of formation comprises an alternation of depositions of layers of material intended to form the solid plate lower Bragg mirror 34. Particularly advantageously, this alternation of layers continues until reaching a desired thickness with respect to the expected optical properties. Preferably the thickness of this solid plate lower Bragg mirror 34 is greater than the thickness of the upper Bragg mirror 23.

FIG. 6g shows a step of structuring via etching of the solid plate lower Bragg mirror 34 in such a way as to form the plurality of lower Bragg mirrors 33 and/or the optical openings 43. As for the structuring of the second plurality of reflecting surfaces 32 of the second embodiment, this step of structuring consists principally in forming a checkerboard pattern or a series of strips parallel between them. As for the preceding embodiment, this step of structuring comprises the definition of a periodic network extending in the principal plane (x, y).

FIG. 6h shows a top view of the second substrate 30. In this example, the plurality of lower Bragg mirrors 33 was structured in such a way as to form a checkerboard patter comprised of lower Bragg mirrors 33 and of optical openings 43 devoid of lower Bragg mirrors 33.

Advantageously, this checkerboard patter is complementary of that formed by the first plurality of reflecting surfaces 23.

FIG. 6i shows a step of deposition of a silicon oxide for example, so as to fill in the spaces between each lower Bragg mirror. This step can be followed by optional steps of planarization via mechanical-chemical polishing providing the same advantages as those described hereinabove.

FIG. 6j shows the turning over of the second substrate 30 according to the direction (x).

FIG. 6k shows the formation of a portion of the channel 50. As hereinabove, this formation can advantageously be carried out via etching.

FIG. 6l shows the assembly, via molecular gluing for example, of the first substrate 20 with the second substrate 30.

This assembly is carried out in such a way that the optical inlet 20a and the plurality of lower Bragg mirrors 33 are located on either side of the channel 50 and of the first plurality of reflecting surfaces 22 and of the upper Bragg mirror 23.

Figure 7A:
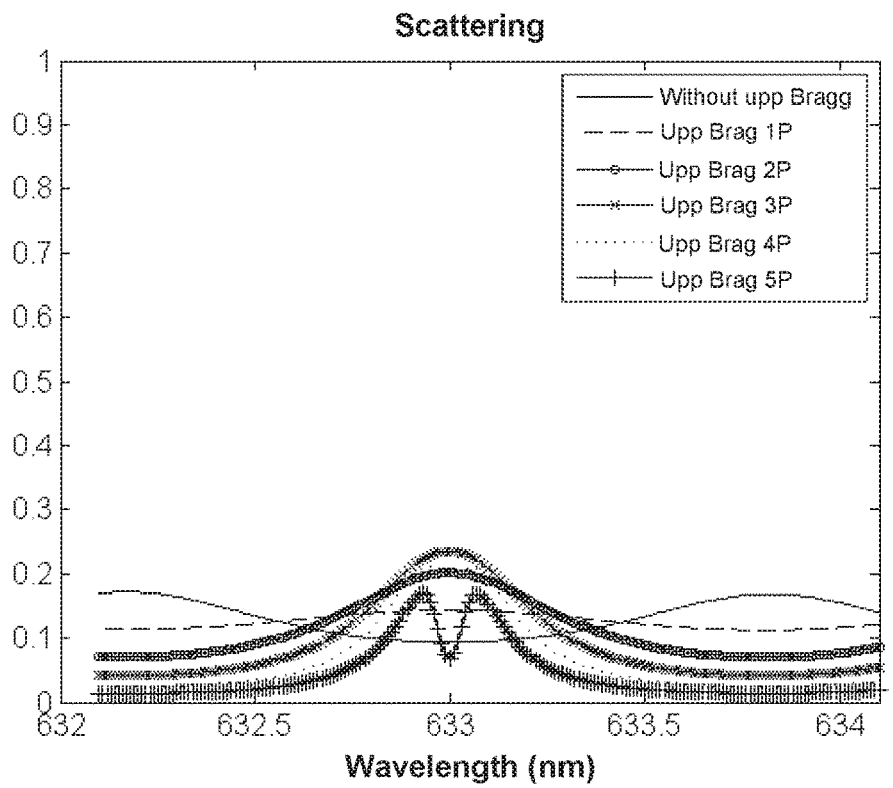
FIGS. 7a and 7b show two digital simulations that make it possible to evaluate the signal referred to as "scattered" measured on the matrix of photo detectors of a detector of particles according to the present invention in the presence of an upper Bragg mirror of the $SiN/SiO_2$ type on first substrate.
Figure 7B:
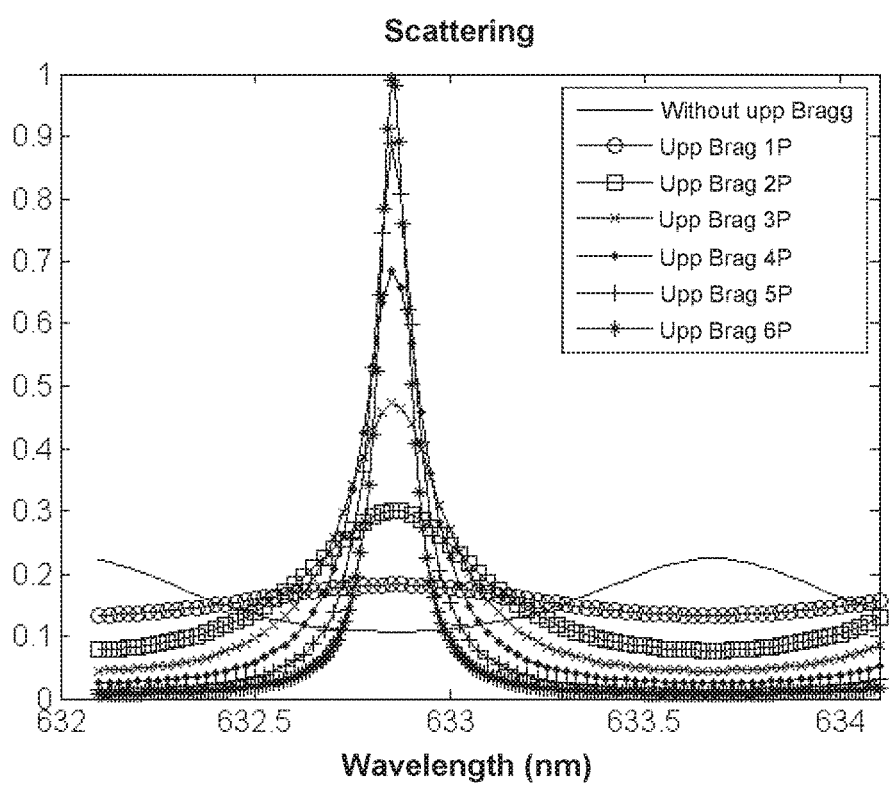

FIGS. 7a and 7b show two simulations having the scattered signal measured by the matrix 41 of photo detectors 42 according to the number of periods P of alternation of SiN layers and of $SiO_2$ layers of the upper Bragg mirror 23. This scattered signal is standardised with respect to the signal of the pump.

FIG. 7a corresponds to the second embodiment, i.e. to the one shown in FIG. 3 and comprising an upper Bragg mirror and a second plurality of reflecting surfaces 32 formed by reflecting surfaces other than Bragg mirrors, for example metallic surfaces.

FIG. 7b corresponds to the case where the detector of particles comprises the plurality of lower Bragg mirrors 33 having 20 periods P and comprising an alternation of SiN and of SiO₂, i.e. in the case of the third embodiment shown in FIG. 5.

These two simulations perfectly show that using metal mirrors forming the second plurality of reflecting surfaces 32 induces losses via absorption that limit the amplification of the scattered signal to a factor substantially equal to 2.

In the case of the use of a plurality of lower Bragg mirrors 33, the critical coupling makes it possible to be able to scatter nearly 100% of the incident luminous radiation, which is an amplification of the scattered signal substantially equal to a factor of 10. It was determined that this amplification is achieved for a number of periods P of the alternation of the upper Bragg mirror 23 equal to 6.

For the realisation of these simulations, the following parameters and assumptions were used:

The particles 60 present in the channel 50 can be considered as a medium with a complex refraction index: $\tilde{n}=n+ik$ where k represents the scattering losses.

It can be shown via calculations that k is connected to the topology of the medium by:

$$k = -\frac{\lambda}{4\pi}\ln(1-\pi r^2 Q_{scatt} C)$$

Where:
λ is the wavelength (in micrometres (μm));
r is the radius of the particles (in μm);
$Q_{scatt}$ is the scattering effectiveness on the particle (in light of its radius and its refraction index. $Q_{scatt}$ can be determined by digital simulation through for example the Mie scattering theory);
C is the concentration of particles (in number of particles/μm³).

Numerically, the following assumptions were made in order to conduct these simulations:

The wavelength is: λ=633 nm.

Considered are particles with a diameter of 200 nanometres (nm), with a refraction index 1.5 and with a scattering effectiveness Qscatt=0.27.

The concentration of the particles is set to C=10¹¹ particles/cm³.

An optical cavity of 100 μm in thickness is considered.

The application of these parameters and of these assumptions makes it possible to highlight the substantial improvement in the detection of particles in the case of the third embodiment with respect to the second embodiment of the present invention.

By way of a non-limiting example, the following numerical values, materials and dimensions can be adapted to the various elements of the present invention:

Preferably, the incident luminous radiation comprises a wavelength between 200 nm and 2 μm, preferably between 300 nm and 1 μm and advantageously between 400 nm and 700 nm.

First Substrate:
The thickness of the first substrate is between 10 μm and 1 cm, preferably between 100 μm and 1 mm and advantageously between 300 μm and 800 μm.
The thickness of the first plurality of reflecting surfaces is between 50 nm and 1 μm, preferably between 75 nm and 500 nm and advantageously between 100 nm and 200 nm.
The first substrate is formed from at least one material allowing to pass at least 50%, more preferably at least 75% and preferably at least 90% of said incident luminous radiation, more preferably the first substrate comprises a transparent material with respect to said incident luminous radiation.
The first substrate comprises at least one material taken from the following materials: glass, plastic.

First Plurality of Reflecting Surfaces:
The first plurality of reflecting surfaces comprises at least 1 reflecting surfaces, more preferably at least 10 reflecting surfaces and advantageously at least 100 reflecting surfaces.
The reflecting surfaces of the first plurality of reflecting surfaces have a reflection coefficient equal at least to 50%, preferably at least to 75% and advantageously at least to 90%.
The first plurality of reflecting surfaces comprises at least one material taken from among the following materials: aluminium, copper, Or, Argent, tungsten.

Upper Bragg Mirror
Advantageously, the upper Bragg mirror comprises an alternation of at least one layer of SiO2 with at least one layer taken from among the following layers: SiN, TiO2, amorphous silicon.
The upper Bragg mirror has a number of periods greater than 1, more preferably greater than 2 and advantageously greater than 3.
The upper Bragg mirror has a period greater than 75 nm, more preferably greater than 125 nm and advantageously greater than 200 nm.
The upper Bragg mirror has an average refraction index between 1 and 3.5, preferably between 1.5 and 2.5 and advantageously between 1.5 and 2.
The upper Bragg mirror has a thickness greater than 100 nm, more preferably greater than 250 nm and advantageously greater than 500 nm.
The upper Bragg mirror has a reflection coefficient equal at least to 25%, preferably at least to 50% and advantageously at least to 75%.
The upper Bragg mirror has a surface facing the channel for the circulation of particles equal to at least 1 μm, preferably at least to 5 μm and advantageously at least to 10 μm.

Second Substrate:
The thickness of the second substrate is between 10 μm and 1 cm, preferably between 100 μm and 1 mm and advantageously between 300 μm and 800 μm.
The thickness of the second plurality of reflecting surfaces is between 50 nm and 1 μm, preferably between 75 nm and 500 nm and advantageously between 100 nm and 200 nm.
The second substrate is formed from at least one material allowing to pass at least 50%, more preferably at least 75% and preferably at least 90% of said incident luminous radiation, more preferably the second substrate comprises a transparent material with respect to said incident luminous radiation.
The second substrate comprises at least one material taken from the following materials: glass, plastic.

Second Plurality of Reflecting Surfaces:
The second plurality of reflecting surfaces comprises at least 1 reflecting surfaces, more preferably at least 10 reflecting surfaces and advantageously at least 100 reflecting surfaces.

The reflecting surfaces of the second plurality of reflecting surfaces have a reflection coefficient equal at least to 50%, preferably at least to 75% and advantageously at least to 90%.

The second plurality of reflecting surfaces comprises at least one material taken from among the following materials: aluminium, copper, Gold, Silver, tungsten.

Plurality of Lower Bragg Mirrors:

Advantageously, the plurality of lower Bragg mirrors comprises an alternation of at least one layer of $SiO_2$ with at least one layer taken from among the following layers: SiN, $TiO_2$, amorphous silicon.

The plurality of lower Bragg mirrors has a number of periods greater than 3, more preferably greater than 5 and advantageously greater than 10.

The plurality of lower Bragg mirrors has a period greater than 75 nm, more preferably greater than 125 nm and advantageously greater than 200 nm.

The plurality of lower Bragg mirrors has an average refraction index between 1 and 3.5, preferably between 1.5 and 2.5 and advantageously between 1.5 and 2.

The plurality of lower Bragg mirrors has a thickness greater than 500 nm, more preferably greater than 750 nm and advantageously greater than 1 μm.

The plurality of lower Bragg mirrors has a reflection coefficient equal at least to 75%, preferably at least to 90% and advantageously at least to 99%.

The plurality of lower Bragg mirrors has a surface facing the channel for the circulation of particles equal to at least 1 $\mu m^2$, preferably at least to 5 $\mu m^2$ and advantageously at least to 10 $\mu m^2$.

The reflecting surfaces of the first plurality of reflecting surfaces can have shapes and/or sizes that are different from those of the second plurality of reflecting surfaces.

Optical Cavity:

The thickness of the optical cavity, i.e. the distance, taken along the axis z, that separates the first plurality of reflecting surfaces from the second plurality of reflecting surfaces, is between 1 μm and 1 cm, preferably between 10 μm and 1 mm and advantageously between 100 μm and 500 μm.

The width of the optical cavity, taken along the axis x, is between 1 μm and 1 mm, preferably between 5 μm and 100 μm and advantageously between 10 μm and 50 μm.

The horizontal surface of the optical cavity, according to the plane (x, y), is between 1 $\mu m^2$ and 1 $mm^2$, preferably between 25 $\mu m^2$ and $10^4$ $\mu m^2$ and advantageously between 100 $\mu m^2$ and 2500 $\mu m^2$.

The optical cavity has a quality factor greater than 10, more preferably greater than 100 and advantageously greater than 1000.

Channel for the Circulation of Particles:

The thickness of the channel, taken along the axis z, is between 1 μm and 1 cm preferably between 10 μm and 1 mm and advantageously between 10 μm and 500 μm.

The width of the channel, taken along the axis x, is between 10 μm and 10 cm, preferably between 100 μm and 1 cm and advantageously between 100 μm and 1 mm.

The length of the channel, taken along the axis y, is between 10 μm and 10 cm, preferably between 100 μm and 1 cm and advantageously between 100 μm and 1 mm.

It is to be noted that the present invention can also be applied to liquid fluids conveying particles. Thus, in the present description, a "fluid" means a body of which the constituents, the particles for example, have little adhesion and can freely slide on one another, in the case of a liquid, or be displaced independently of each other, in the case of a gas. According to this definition, air is a fluid, as well as water. A fluid can transport particles, such as nanometric particles transported by the air for example.

It is to be noted that a very low roughness on the surface of each interface of the present invention makes it possible to minimise, and even prevent, the presence of scattered light rays during the passage of light rays through these interfaces.

Indeed, in order to satisfy the rigorous conditions of the detection of particles by the measurement of a diffraction diagram, it is suitable to limit as much as possible the roughness of the interfaces.

This roughness, if it is too high, can induce a parasitic diffraction, referred to as background diffraction, measured by the photo detectors 42 even in the absence of particles 60 in the channel 50. A processing of the signals measured can make it possible to reduce this nuisance, however the methods described here provide a very low roughness at the interfaces reducing the problems of parasitic diffraction. The accuracy of the detection is thus improved.

The matrix of photo detectors can advantageously be periodic or aperiodic and have a polygonal or circular shape.

The channel can be open or closed according to the X axis or y. Preferably, it is open.

Advantageously, a certain number of openings can be made, passing entirely through the first substrate, and opening into the channel, in such a way as to allow the particles to enter and exit from the channel.

The particles are therefore not necessarily stationary in the channel but pass through it and/or are displaced in the channel.

The implementation of the present invention can comprise the use of various mathematical and computer tools in order to extract from the measurements of the photo detectors, intrinsic parameters of the particles such as their size for example.

Those skilled in the art can find such tools in the following references: "The Mie Theory: Basics and Applications"; Wolfram Hergert, Thomas Wriedt; Springer, 30 Jun. 2012-259 pages or "Light scattering and surface plasmons on small spherical particles", Xiaofeng Fan, Weitao Zheng and David J Singh, Light: Science & Applications (2014) 3 or J. R. Hodkinson and I. Greenleaves, "Computations of Light-Scattering and Extinction by Spheres According to Diffraction and Geometrical Optics, and Some Comparisons with the Mie Theory", Journal of the Optical Society of America 53, 577 (1963).

The invention is not limited to the embodiments described but extends to any embodiment that falls within the scope of claim 1.

REFERENCES

10. Optical device
11. Incident luminous radiation
12. Scattered light rays
13. Scattered light rays reflected a first time
14. Scattered light rays reflected several times
20. First substrate
20a. Optical Inlet
21. First transparent medium
22. First plurality of reflecting surfaces
23. Upper Bragg mirror
24. Optical Passage 30. Second substrate
31. Second transparent medium
32. Second plurality of reflecting surfaces
33. Plurality of lower Bragg mirrors
34. Solid plate lower Bragg mirror
40. Third substrate
41. Matrix of photo detectors
42. Photo detectors
43. Optical opening
50. Channel for the circulation of particles
51. Portion of the channel for the circulation of particles
60. Particle(s)
61. Circulation of particles
70. Optical Cavity

The invention claimed is:

1. A particle detector, comprising:
one channel configured to receive at least one fluid comprising particles;
one optical inlet configured to receive at least one incident luminous radiation;
a first plurality of reflecting surfaces arranged between the optical inlet and the channel;
a matrix of photo detectors arranged facing the channel; and
a second plurality of reflecting surfaces arranged between the channel and the matrix of photo detectors such that the channel is disposed between the first and the second pluralities of reflecting surfaces,
wherein the first and the second pluralities of reflecting surfaces, the matrix of photo detectors, and the channel being arranged such that a portion at least of the incident luminous radiation passing through the channel is scattered by at least one particle present in the channel thus forming scattered light rays, the reflecting surfaces of the second plurality extending principally in a plane and being spaced from one another in the plane in order to arrange spaces between them, such that a portion at least of the scattered light rays can pass from the channel to the matrix of photo detectors by passing through the spaces between the reflecting surfaces of the second pluralities of reflecting surfaces and without passing through a reflecting surface of the second plurality.

2. The detector according to claim 1, wherein the first and the second pluralities of reflecting surfaces, the matrix of photo detectors and the channel are arranged such that a portion at least of the scattered light rays is reflected off at least one reflecting surface of the first plurality of reflecting surfaces, and then reaches the matrix of photo detectors by passing between the reflecting surfaces of the second pluralities of reflecting surfaces.

3. The detector according to claim 1, wherein the first and the second pluralities of reflecting surfaces are arranged in a complementary manner such that all the photo detectors of the matrix arranged in line with the at least one optical inlet are masked by at least one reflecting surface of one among the first and the second plurality of reflecting surfaces.

4. The detector according to claim 1, wherein the first and the second pluralities of reflecting surfaces are arranged in a complementary manner such that the reflecting surfaces of the first plurality of reflecting surfaces are not arranged in line with reflecting surfaces of the second plurality of reflecting surfaces.

5. The detector according to claim 1, wherein the detector is configured such that a portion at least of the incident luminous radiation is reflected by a portion at least of the second plurality of reflecting surfaces before and/or after being scattered by at least one particle.

6. The detector according to claim 5, wherein the first and the second pluralities of reflecting surfaces are arranged so as to define therebetween at least one optical cavity, the at least one optical cavity comprising the channel and being configured such that a portion at least of the scattered light rays are reflected a plurality of times before reaching the matrix of photo detectors.

7. The detector according to claim 1,
wherein the first plurality of reflecting surfaces has a first distribution as a checkerboard pattern in a first plane, and
wherein the second plurality of reflecting surfaces has a second distribution in a checkerboard pattern in a second plane parallel to the first plane, with the first distribution in a checkerboard pattern and the second distribution in a checkerboard pattern being complementary.

8. The detector according to claim 1, further comprising at least one upper Bragg mirror arranged between the first plurality of reflecting surfaces and the channel.

9. The detector according to claim 1, wherein the second plurality of reflecting surfaces comprises a plurality of lower Bragg mirrors.

10. The detector according to claim 8,
wherein the second plurality of reflecting surfaces comprises a plurality of lower Bragg mirrors, and
wherein a thickness of the upper Bragg mirror is less than a thickness of the plurality of lower Bragg mirrors.

11. The detector according to claim 8,
wherein the second plurality of reflecting surfaces comprises a plurality of lower Bragg mirrors, and
wherein a reflection coefficient of the upper Bragg mirror is less than a reflection coefficient of the plurality of lower Bragg mirrors.

12. The detector according to claim 8,
wherein the second plurality of reflecting surfaces comprises a plurality of lower Bragg mirrors,
wherein the upper Bragg mirror has a first number of periods,
wherein the plurality of lower Bragg mirrors has a second number of periods, and
wherein the first number of periods is less than the second number of periods.

13. The detector according to claim 8,
wherein the second plurality of reflecting surfaces comprises a plurality of lower Bragg mirrors,
wherein the upper Bragg mirror comprises an alternation of at least one layer of $SiO_2$ with at least one layer taken from among the following layers: SiN, $TiO_2$, and amorphous silicon, and
wherein the plurality of lower Bragg mirrors comprises an alternation of at least one layer of $SiO_2$ with at least one layer taken from among the following layers: SiN, $TiO_2$, and amorphous silicon.

14. The detector according to claim 1, wherein the channel is delimited in part at least by a first substrate and a second substrate, the first substrate comprising at least the first plurality of reflecting surfaces, and the second substrate comprising at least the second plurality of reflecting surfaces.

15. The detector according to claim 1, forming a stack of layers, the stack comprising at least one first substrate, a second substrate, and a third substrate, the first substrate comprising at least the first plurality of reflecting surfaces, the second substrate comprising at least the second plurality of reflecting surfaces, and the third substrate comprising at least the matrix of photo detectors, e channel is delimited in part at least by the first and the second substrates.

16. The detector according to claim 1, wherein the reflecting surfaces of the first plurality of reflecting surfaces extend principally in a plane and are spaced from one another in the plane in order to arrange openings between them, the detector being configured such that a portion at least of the incident radiation can penetrate into the channel by passing through the openings and without passing through the reflecting surface of the first plurality.

17. The detector according to claim 1, wherein the detector is configured such that a portion at least of the scattered light rays can pass from the channel to the matrix of photo detectors without passing through any reflecting surface.

18. The detector according to claim 1, wherein the detector is configured such that a portion at least of the incident luminous radiation can reach the channel without passing through any reflecting surface.

* * * * *